(12) United States Patent
Wegenberger et al.

(10) Patent No.: US 11,718,461 B2
(45) Date of Patent: Aug. 8, 2023

(54) COMPOSITE MATERIAL FOR THE PRODUCTION OF SEALING FOILS AND SEALING FOILS MADE THEREFROM

(71) Applicant: CONSTANTIA TEICH GMBH, Weinburg (AT)

(72) Inventors: Alfred Wegenberger, Langenlois (AT); Martin Kornfeld, Klosterneuburg (AT); Adolf Schedl, Lilienfeld (AT); Matthias Steiner, Weinburg (AT)

(73) Assignee: CONSTANTIA TEICH GMBH, Weinburg (AT)

( * ) Notice: Subject to any disclaimer, the term of this patent is extended or adjusted under 35 U.S.C. 154(b) by 0 days.

(21) Appl. No.: 17/627,320

(22) PCT Filed: Jul. 7, 2020

(86) PCT No.: PCT/EP2020/062735
§ 371 (c)(1),
(2) Date: Jan. 14, 2022

(87) PCT Pub. No.: WO2021/008752
PCT Pub. Date: Jan. 21, 2021

(65) Prior Publication Data
US 2022/0274759 A1    Sep. 1, 2022

(30) Foreign Application Priority Data
Jul. 16, 2019  (EP) .................... 19186564

(51) Int. Cl.
*B65D 77/20* (2006.01)
*B32B 27/08* (2006.01)
(Continued)

(52) U.S. Cl.
CPC .......... *B65D 77/2056* (2013.01); *B32B 27/08* (2013.01); *B32B 27/32* (2013.01);
(Continued)

(58) Field of Classification Search
CPC ..... B65D 77/2056; B32B 27/08; B32B 27/32; B32B 27/36; B32B 2307/7242;
(Continued)

(56) References Cited

U.S. PATENT DOCUMENTS 3,335,939 A * 8/1967 Robinson, Jr. ..... B65D 77/2056
                                                229/123.2
4,693,390 A * 9/1987 Hekal ................ B65D 77/2056
                                                229/125.17
(Continued)

FOREIGN PATENT DOCUMENTS

EP       2327635 A1    6/2011
WO    200080006123 A1    1/2008

*Primary Examiner* — Kareen K Thomas
(74) *Attorney, Agent, or Firm* — Raven Patents, LLC; Anton E. Skaugset

(57) ABSTRACT

Composite materials, and sealing foils prepared with such composite materials for sealing a container, where the composite materials include an inner layer configured to face the container during sealing, the inner layer being single- or multi-layer, and including a self-contained and closed weakening line; an outer layer that may be single- or multi-layer, and that is configured to be peeled from the inner layer; where an area of the inner layer delimited by the closed weakening line remains attached to the outer layer when the outer layer is peeled from the inner layer, thereby creating a hole in the inner layer; the outermost of the inner layers is in contact with the outer layer, and includes a semicrystalline ethylene-propylene copolymer that is substantially free of dienes; and the innermost of the outer layers is a barrier layer or a lacquer.

20 Claims, 1 Drawing Sheet

(51) Int. Cl.
*B32B 27/32* (2006.01)
*B32B 27/36* (2006.01)

(52) U.S. Cl.
CPC ...... *B32B 27/36* (2013.01); *B32B 2307/7242* (2013.01); *B32B 2307/748* (2013.01); *B32B 2435/02* (2013.01)

(58) Field of Classification Search
CPC .......... B32B 2307/748; B32B 2435/02; B32B 15/08; B32B 15/20; B32B 2255/06; B32B 2255/26; B32B 2307/30; B32B 2307/72; B32B 3/30; B32B 7/12; B32B 3/266; B32B 7/06; B32B 15/085
See application file for complete search history.

(56) References Cited

U.S. PATENT DOCUMENTS

| | | | | |
|---|---|---|---|---|
| 4,735,335 | A * | 4/1988 | Torterotot | B32B 15/08 220/359.3 |
| 4,771,937 | A * | 9/1988 | Kamada | B65D 77/206 229/123.1 |
| 4,801,041 | A * | 1/1989 | Takata | B29C 65/76 220/359.3 |
| 4,848,931 | A * | 7/1989 | Kamada | B32B 15/08 383/111 |
| 4,858,780 | A * | 8/1989 | Odaka | B65D 77/2044 220/359.3 |
| 4,905,838 | A * | 3/1990 | Suzuki | B29C 66/71 229/123.1 |
| 4,913,307 | A * | 4/1990 | Takata | B29C 66/232 220/276 |
| 5,141,126 | A * | 8/1992 | Takata | B65D 77/2056 220/359.3 |
| 5,160,767 | A * | 11/1992 | Genske | B29C 48/185 215/261 |
| 5,167,339 | A * | 12/1992 | Takata | B32B 27/08 229/123.1 |
| 5,178,293 | A * | 1/1993 | Suzuki | B32B 7/06 229/123.1 |
| 5,197,618 | A * | 3/1993 | Goth | B65D 51/20 229/123.1 |
| 5,213,227 | A * | 5/1993 | Koyama | B65D 1/28 426/126 |
| 5,235,149 | A * | 8/1993 | Boehrer | B65D 77/2024 426/243 |
| 5,342,684 | A * | 8/1994 | Carespodi | B32B 7/14 428/347 |
| 5,759,650 | A * | 6/1998 | Raines | A23L 3/3427 426/123 |
| 6,056,141 | A * | 5/2000 | Navarini | B65D 77/2044 428/35.8 |
| 6,248,380 | B1 * | 6/2001 | Kocher | B65D 77/2024 426/396 |
| 6,308,853 | B1 * | 10/2001 | Jud | B65D 77/2024 220/359.3 |
| 6,790,508 | B2 * | 9/2004 | Razeti | B32B 15/08 229/123.1 |
| 7,789,262 | B2 * | 9/2010 | Niederer | B65D 77/2032 229/123.1 |
| 2008/0110896 | A1 * | 5/2008 | Westphal | B65D 77/2032 29/592 |

* cited by examiner

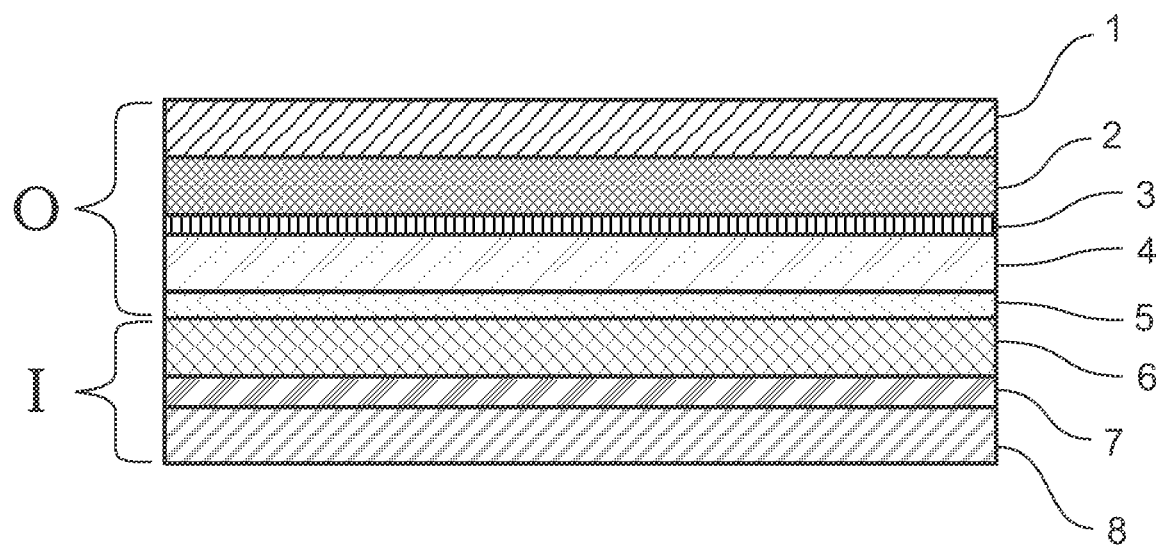

COMPOSITE MATERIAL FOR THE PRODUCTION OF SEALING FOILS AND SEALING FOILS MADE THEREFROM

TECHNICAL FIELD

The present disclosure relates to consumer product packaging; and more particularly to the sealing foils used to form the lids of product containers such as, for example, yogurt cups.

BACKGROUND

The present disclosure is directed to composite materials for the production of sealing foils for product containers. Such sealing foils typically include two layers, each of which, independently of one another, can itself include one or more layers, and the inner layer of the sealing foil, which faces the item or the container during sealing, incorporates a self-contained weakening line (in many cases also referred to as FIGURE, area, part). The weakening line, which is preferably produced by a laser, ideally extends from the side facing the packaged material almost, but not all the way through the inner layer. Furthermore, the outer layer can be peeled away from the inner layer, whereby during peeling the area of the inner layer that is delimited by the closed weakening line remains on the outer layer, so that a hole is created in the inner layer when the outer layer is peeled off, through which the contents of the container are accessible. If several such weakening lines are provided, this applies mutatis mutandis to each such FIGURE, area, and part.

Similar sealing foils are disclosed by WO2008/006123 A1 and EP 2 327 635 A1, both filed by the applicant. The PCT publication WO2008/006123 is directed to the material itself and suggests the use of substances of different polarity in the border area of the layers to be separated. The European application EP 2 327 635 is special in that the weakening line lies within the seal area of the sealing foil, so that when the seal is opened, the seal is not broken, but rather the two layers separate in the area of the seal seam. This makes it possible to seal "hard" and still maintain the ability to reliably open.

The outer layer of such sealing foils typically has an aluminum foil as a barrier layer, which is provided on the side facing the inner layer with a lacquer to protect the aluminum and optionally as an adhesion promoter. The inner layer of at least one polymer is then applied, preferably by coextrusion, which is so strongly or so weakly bonded to the lacquer that on the one hand peeling off is reliably possible, on the other hand the desired part of the inner layer when peeling off from the inner layer is loosened and adheres to the outer layer. The separation of the two layers during peeling thus takes place between the lacquer and the polymer layer adjacent to the lacquer.

According to EP 2 327 635, this strength of adhesion is achieved by various combinations of polar and non-polar substances at the boundary of the layers, the contact surface, and has essentially proven itself. However, areas of application for such multilayer films have recently been opened up in which the self-contained weakening lines of the inner layer only enclose a very small area, so that there is a large length of weakening line per unit area of these areas, which in various cases leads the area intended for removal to either stick to the lower layer or, what is even more undesirable, be peeled off along the weakening line, but due to the bending of the upper layer when peeling off, it does not stick to it, but falls into the container with the product. Since the packaged material is in most cases a food product, this is unpleasant and undesirable.

The underlying problem for such sealing foils lies in the quality of the weakening line, which is usually produced by a laser that, despite all efforts, has a certain range of fluctuation in output; and additionally in that the sealing foils used almost inevitably deviate from their global, average properties in some small areas, and the above-mentioned problems occur in the case of an unfavorable overlapping of a poor quality weakening line with an area of the foil that exhibits such deviation.

What is needed, therefore, is a sealing foil that exhibits a connection between the two layers making up the foil that reliably avoids these problems and, even where the portion of the inner layer to be removed is very small, will reliably hold without making it difficult to peel off the outer (upper) layer. By "small areas" is meant, for example, circles with a diameter of less than 12 mm, more notably circles with a maximum diameter of 8 mm, most notably with a diameter of 4 mm and even less. For non-circular areas, the equivalent diameter (i.e. the diameter of a circle of the same area) is decisive.

The present disclosure is directed to providing such a sealing foil.

SUMMARY

The present disclosure is directed to composite materials suitable for the production of sealing foils for sealing a container.

The composite materials of the disclosure may include an inner layer configured to face the container during sealing, the inner layer being single- or multi-layer, and including a self-contained and closed weakening line; an outer layer that may be single- or multi-layer, and that is configured to be peeled from the inner layer; where an area of the inner layer delimited by the closed weakening line remains attached to the outer layer when the outer layer is peeled from the inner layer, thereby creating a hole in the inner layer; the outermost of the inner layers is in contact with the outer layer, and includes a semicrystalline ethylene-propylene copolymer that is substantially free of dienes; and the innermost of the outer layers is a barrier layer or a lacquer.

The disclosed features, functions, and advantages of the disclosed apparatus, systems, and methods may be achieved independently in various embodiments of the present disclosure, or may be combined in yet other embodiments, further details of which can be seen with reference to the following description and drawing.

BRIEF DESCRIPTION OF THE DRAWING

The FIGURE schematically depicts a cross-section of a sealing foil according to the present disclosure, shown from the outermost surface (top) to the innermost surface (bottom).

DETAILED DESCRIPTION

The present disclosure is directed to sealing foils prepared using a composite material having an inner layer and an outer layer, where at least the outermost layer of the inner layer is produced from a material as described in US 2004/0236042, or WO 2007/081491, or WO 2007/115816. Such materials are commercially available for example under the name VISTAMAXX, sold by Exxon Mobil Chemical. The polypropylene (PP) compositions known from EP 2 738 216 can also be used according to the present disclosure.

These materials, as described in the literature, are semicrystalline ethylene-propylene copolymers that are substantially free of dienes. The intramolecular differences in tacticity are also statistically insignificant.

The respective disclosures of US published application no. 2004/0236042, international publication no. WO 2007/081491, international publication no. WO 2007/115816, European patent no. EP 2 738 216 and US published application no. US 2009/311475 (corresponding to EP 2 040 915 as previously mentioned) are hereby incorporated by reference, for all purposes.

The innermost layer of the outer layer is typically a lacquer layer, which may serve as an adhesion promoter and/or protective layer (corrosion, mechanical damage) for the aluminum and which adheres firmly to the aluminum. This lacquer can be any of the lacquers used in the state of the art for such a purpose.

The material used according to the present disclosure for the outermost layer of the inner layer may have a density of 900 kg/m$^3$, and preferably a density of 879±5 kg/m$^3$, and, independently of one another, one or more of the following properties:

A viscosity at 190° C. of about 1200 mPas;
A hardness (Shore C) of about 53;
A tensile strength at break of about 6.2 MPa;
A tensile strength at 100% of about 4 MPa;
An elongation at break of about 1250%;
A glass transition temperature of about −22° C.±3° C.; and
A melting temperature of about 97° C.±3° C.

The upper limit of the density, according to previous tests, must be of exactly 900 kg/m$^3$, the "approximate" values in this list mean a range of ±5%; the ranges for densities and temperatures is given there.

As shown in the single FIGURE, a sealing foil according to the present disclosure may have the following structure, presented purely schematically, whereby the nomenclature "layers-folds" given at the beginning cannot be adhered to here because of the designation as "layer(s)" which is common in the state of the art:

1. Print protection layer 1 (outermost of the outer layers, facing the surroundings)
2. Print layer 2 (possibly including print base layer)
3. Adhesion promoter 3
4. Barrier layer 4, typically but not exclusively aluminum foil
5. Lacquer 5 (serving as an adhesion promoter and/or a protective layer for the aluminum of the barrier layer 4)
6. Layer 6 (outermost of the inner layers) containing a semicrystalline ethylene-propylene copolymer that is substantially free of dienes, as described by the present disclosure
7. Inner sealing layer made of polypropylene 7
8. Outer sealing layer 8 (innermost of the inner layers, facing the goods to be packaged and sealed onto the container)

It should be understood that the composite materials of the disclosure may include additional layers. Furthermore, layers 4, 6 and 8 may be regarded as essential layers (again thusly called here in accordance with the nomenclature).

The ethylene-propylene copolymer material of layer 6 may be coextruded with polypropylene in a proportion of 15-65% by weight, preferably 20-60% by weight. If an inner sealing layer 7 (the term "inner" refers here to the layer within the composite material) made of polypropylene is present, the same polypropylene is advantageously also used for the layer 6. The greater the proportion of the material used according to the invention, the thinner the layer 6 can be made, which is beneficial for processability, so that, despite the higher proportion in costs, no more of the more expensive material has to be used. With higher proportions, the toughness increases and thus the tear behavior is better, even if the layer thickness is minimized.

The polypropylene of layer 7 can be a polypropylene homopolymer, to which about 30 wt. % LDPE or, alternatively, about 20 wt. % PP-HMS, or, again, alternatively, 10-30 wt.-% PP random polymer is added. These percentages relate to the sum of the polypropylene homopolymer and the additive (still without the ethylene-propylene copolymer material according to the present disclosure). This, simply referred to as "PP" for layer 6, is then mixed with the ethylene-propylene copolymer material used according to the present disclosure.

Some of the layers of the composite material can be omitted or replaced by other materials. In contrast, layer 6, which has direct contact with the outer layer (barrier 4 or lacquer 5), and layer 7 (polypropylene) contacting this layer 6, may be deemed substantially necessary.

The material of the barrier layer 4 can, in addition to the currently most popular aluminum, take the form of a film from the group of polyesters, such as polyethylene terephthalate (PET), the polyester film with an additional surface treatment in the form of a metallization or another inorganic layer, for example made of SiOx or AlOx or an adhesion-promoting layer (primer) can be provided for applying a sealing layer; of polyamides, such as PA 6 or PA 12, or other materials from this group; of polyolefins, such as polyethylene (PE), ethylene copolymers (EVA, EMA, etc.) or mixtures of these, of polypropylene (PP), polypropylene copolymers or other thermoplastic polyolefins; of biopolymers based on renewable raw materials, such as from starch polymers, from polylactic acid (PLA), from lignin-based polymers, from polyhydroxyalkanoates (PHAs), from corresponding mixtures or compounds, from biodegradable/compostable raw materials such as special bio-polyesters; or combinations thereof; and the lamination adhesive is selected from wet lamination adhesives, dispersion adhesives, dry lamination adhesives, solvent-free adhesive systems, cold seal adhesives or extrusion-coated lamination.

As per the state of the art, the thickness of the layers 6 and 7 is important for the mechanical properties, whereby the use of the materials set out in the present disclosure under otherwise identical conditions improves the mechanical properties, so that a reduction over the two layers together is possible without impairment of the properties.

The lacquer 5 is almost without exception necessary and serves as a barrier layer 4 for aluminum, provided that the surface of the aluminum is not prepared in a complex manner, but lacquer 5 can be omitted for many of the other barrier layers mentioned, it should only be briefly stated that a solvent lacquer with an acrylate binder is appropriate, as by adding different amounts of mineral filler, in particular talc, the bond strength achieved can easily be brought to a narrow range, the bond strength decreasing while the filler content increases.

An appropriate acrylic varnish for the purposes of the present disclosure can be a commercially available "combination heat-sealing lacquer", which means combination lacquer systems which—when used in the state of the art for sealing foils, for example for yogurt cups, seal against both polystyrene and polypropylene cups so that they can be peeled off (e.g. ACTESEAL from ACTEGA, also available in a water-based version, or ODASEAL from Hans Jung GmbH & Co. KG).

In the state of the art there are also other so-called combination lacquer systems that can be used, which contain, for example, styrene-butadiene copolymers or polyester resins. The lacquer of DE 10 2011 086 327 A, likewise with filler to regulate the adhesion, should also be mentioned in this context. Furthermore, those that contain binders based on vinyl chloride polymers should also be mentioned (e.g. those under the brand VINNOL available from Wacker Polymers); However, due to the frequent customer requests for PVC-free materials, these are not always employable, even if they could be used technically.

The composite material thus comprises an outer layer (O) consisting of layers 1-5, and an inner layer (I) consisting of layers 6-8. Peeling of the outer layer occurs thusly between layers 5 and 6. The formation of the weakening lines, which for reasons of strength is only carried out after the merging of layers 1-8, mostly by means of a laser, should cover layers 7-8, but not layer 6. Even if this is mostly achieved, there is also a thermal influence on layer 6, which, when using the ethylene-propylene copolymer materials according to the present disclosure, however, unlike in the state of the art, does not lead to a noticeable reduction or even at least a change in the adhesion between layers 5 and 6.

While strongly fluctuating bond strengths of only 0.25 to 0.5 N/100 mm (measured in accordance with DIN 55543-5 to determine bond strength) and often slightly below that, are achieved in the state of the art, the sealing films according to the present disclosure can reliably achieve values of at least 0.8 N/100 mm and without great effort of 1.0 N/100 mm and, if desired, even more. These values ensure both reliable adhesion of the separated areas, even if these are very small, to the outer layer and also peeling off without the risk of tearing in or tearing off.

The composite materials of the present disclosure are not confined to the exemplary embodiments described, but can be modified in various ways. Since it relates to peeling, in particular the layers that are not involved can be changed without problems and adapted to the respective use case, which is easily achievable for the packaging films field specialist with knowledge of the invention. This also applies to aluminum foil, because even if aluminum is an excellent barrier material, there has been for a number of years a strong tendency to manage without the use of aluminum. Any other material can then be used as the barrier layer, provided that it can either be provided with the lacquer 5, such as aluminum, or inherently has properties such as the lacquer in relation to the adhesion of the layer 6 according to the invention.

In the description and the claims, the terms "front", "rear", "top", "bottom", "inner", "outer" and so on are used in their usual form and with reference to the object in its usual position of use. For example, the muzzle of the barrel of a weapon is "in front", the bolt or slide of the weapon is moved "backwards" by the explosion gases, etc. In the case of vehicles, the usual direction of movement is "in front" or "forward". In the case of packaging, the container is "below" and the sealing foil is "above"; the underside or inner surface of the sealing foil faces the packaged goods, the upper surface or outer surface is directed towards the surroundings.

It should also be pointed out that for terms in the description and the claims such as "lower part" of a suspension, reactor, filter, structure, or a device or an object in general, is intended as the lower half—and particularly the lower quarter—of the total height, "lowest area" as the lowest quarter (particularly any fraction smaller than this); while "middle area" as the middle third of the total height (widthlength). All this information has its common meaning, applied to the intended position of the object under consideration.

In the description and claims, "essentially" or "substantially", unless otherwise stated on the spot, means a deviation of up to 10% of the specified value, if this is physically possible, both downwards and upwards, or otherwise only in the sensible direction; for degrees (angles and temperature), this means ±10°.

All quantities and proportions, particularly those delimiting the invention, unless they relate to the specific examples, are to be understood with a tolerance of ±10%, for example: 11% means: from 9.9% to 12.1%. For terms such as "a solvent", the word "a" not to be seen as a numerical word, but as an indefinite article or as a pronoun, unless the context indicates otherwise.

The term: "combination" or "combinations", unless otherwise stated, describes all types of combinations, starting from two of the constituents in question up to a large number or all of such constituents; the open-ended term "containing" should also be taken to mean "including" or "comprising".

The features and variants specified in the individual configurations and examples can, unless otherwise stated, be freely combined with those of the other examples and configurations, and can particularly be used to characterize the invention in the claims without necessarily including the other details of the respective configuration or the respective example.

The following numbered paragraphs describe selected additional aspects and features of the methods of the present disclosure. Each of these paragraphs can be combined with one or more other paragraphs, and/or with disclosure from elsewhere in this application, including materials incorporated by reference, in any suitable manner. Some of the paragraphs below expressly refer to and further limit other paragraphs, providing without limitation examples of some such suitable combinations.

A1. A composite material for the production of sealing foils for container sealing, comprising of at least two layers, which in turn, independently of one another, are single or multi-layer, wherein the inner layer, which faces the container during sealing has a self-contained weakening line, and the outer layer can be peeled off from the inner layer, with the area of the inner layer delimited by the closed weakening line remaining on the outer layer, which preferably has a barrier layer (4), during peeling, so that when peeling off the outer layer a hole is created in the inner layer, characterized in that the layer (6), which is in contact with the outer layer, consists of semicrystalline ethylene-propylene copolymers which are essentially free of dienes and the outer layer which is connected to this layer (6), is the barrier layer (4) or a lacquer (5).

A2. The composite material according to paragraph A1, characterized in that the ethylene-propylene copolymer of the layer (6) has a density of less than 900 kg/m$^3$, preferably of 879 kg/m$^3$.

A3. The composite material according to paragraph A1 or A2, characterized in that the ethylene-propylene copolymer of the layer (6) has at least one of the following properties:

The viscosity at 190° C. is around 1200 mPa±5%;

The hardness (Shore C) is around 53±5%;

The tensile strength at break is about 6.2 MPa±5%;

The tensile strength at 100% is around 4 MPa±5%;

The elongation at break is around 1250%±5%;

The glass transition temperature is −22° C.±3° C.; and/or
The melting temperature is 97° C.±3° C.

A4. The composite material according to one of paragraphs A1 to A3, characterized in that the barrier layer (4) is made of aluminum and that a lacquer (5) is provided.

A5. The composite material according to one of paragraphs A1 to A4, characterized in that the lacquer (5) is a solvent lacquer with an acrylate binder and preferably with a mineral filler, in particular talc.

A6. The composite material according to one of paragraphs A1 to A4, characterized in that the lacquer (5) is a so-called combination lacquer system, preferably containing styrene-butadiene copolymers or polyester resins and containing mineral filler, in particular talc.

B1. A sealing foil for container sealing, consisting of a composite material, comprising of at least two layers, which in turn, independently of one another, are single or multilayer, wherein the inner layer, which faces the container during sealing has a self-contained weakening line, and the outer layer can be peeled off from the inner layer, with the area of the inner layer delimited by the closed weakening line remaining on the outer layer during peeling, so that a hole is created in the inner layer when the outer layer is peeled off, characterized in that the layer (6) of the inner layer, which is in contact with the outer layer, comprises semicrystalline ethylene-propylene copolymers which are essentially free of dienes, and the outer layer which is connected to this layer (6), is the barrier layer (4) or a lacquer (5).

B2. The sealing foil according to paragraph B1, characterized in that the ethylene-propylene copolymer has a density of less than 900 kg/m$^3$, preferably 879 kg/m$^3$.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

REFERENCE NUMBERS

I Inner layer
O Outer layer
1 Print protection lacquer
2 Print layer
3 Adhesion promoter
4 Barrier layer
5 Lacquer
6 Ethylene-propylene copolymer material according to the disclosure
7 Inner sealing layer made of polypropylene
8 Outer sealing layer

The invention claimed is:

1. A composite material for production of sealing foils for sealing a container, the composite material comprising:
   an inner layer configured to face the container during sealing, the inner layer being single- or multi-layer, and including a self-contained and closed weakening line;
   an outer layer that may be single- or multi-layer, and that is configured to be peeled from the inner layer
   wherein an area of the inner layer delimited by the closed weakening line remains attached to the outer layer when the outer layer is peeled from the inner layer, thereby creating a hole in the inner layer;
   an outermost of the inner layers is in contact with the outer layer, and includes a semicrystalline ethylene-propylene copolymer that is substantially free of dienes; and
   an innermost of the outer layers is a barrier layer or a lacquer.

2. The composite material according to claim 1, wherein the semicrystalline ethylene-propylene copolymer of the outermost of the inner layers has a density of less than 900 kg/m$^3$.

3. The composite material according to claim 1, wherein the semicrystalline ethylene-propylene copolymer of the outermost of the inner layers has a density of about 879 kg/m$^3$.

4. The composite material according to claim 1, wherein the semicrystalline ethylene-propylene copolymer of the outermost of the inner layers has a viscosity of about 1200 mPa±5% at 190° C.

5. The composite material according to claim 1, wherein the semicrystalline ethylene-propylene copolymer of the outermost of the inner layers has a hardness (Shore C) of about 53±5%.

6. The composite material according to claim 1, wherein the semicrystalline ethylene-propylene copolymer of the outermost of the inner layers has a tensile strength at break of about 6.2 MPa±5%.

7. The composite material according to claim 1, wherein the semicrystalline ethylene-propylene copolymer of the outermost of the inner layers has a tensile strength at 100% of about 4 MPa±5%.

8. The composite material according to claim 1, wherein the semicrystalline ethylene-propylene copolymer of the outermost of the inner layers has an elongation at break of about 1250%±5%.

9. The composite material according to claim 1, wherein the semicrystalline ethylene-propylene copolymer of the outermost of the inner layers has a glass transition temperature of about −22° C.±3° C.

10. The composite material according to claim 1, wherein the semicrystalline ethylene-propylene copolymer of the outermost of the inner layers has a melting temperature of about 97° C.±3° C.

11. The composite material according to claim 1, wherein the outer layer includes a barrier layer.

12. The composite material according to claim 11, wherein the barrier layer is aluminum and the outer layer further includes a layer of lacquer adjacent to and inside the barrier layer.

13. The composite material according to claim 12, wherein the layer of lacquer includes a solvent lacquer having an acrylate binder.

14. The composite material according to claim 12, wherein the layer of lacquer further includes a mineral filler.

15. The composite material according to claim 14, wherein the mineral filler includes talc.

16. The composite material according to claim 12, wherein the layer of lacquer includes a combination lacquer system.

17. The composite material according to claim 16, wherein the combination lacquer system includes styrene-butadiene copolymers or polyester resins and a mineral filler.

18. A sealing foil for sealing a container, the sealing foil comprising a composite material that includes:
- an inner layer configured to face the container during sealing, the inner layer being single- or multi-layer, and including a self-contained and closed weakening line;
- an outer layer that may be single- or multi-layer, and that is configured to be peeled from the inner layer
wherein an area of the inner layer delimited by the closed weakening line remains attached to the outer layer when the outer layer is peeled from the inner layer, thereby creating a hole in the inner layer;
an outermost of the inner layers is in contact with the outer layer, and includes a semicrystalline ethylene-propylene copolymer that is substantially free of dienes; and
an innermost of the outer layers is a barrier layer or a lacquer.

19. The sealing foil according to claim 18, wherein the semicrystalline ethylene-propylene copolymer of the outermost of the inner layers has a density of less than about 900 $kg/m^3$.

20. The composite material according to claim 18, wherein the semicrystalline ethylene-propylene copolymer of the outermost of the inner layers has a density of about 879 $kg/m^3$.

* * * * *